United States Patent Office 2,714,943
Patented Aug. 9, 1955

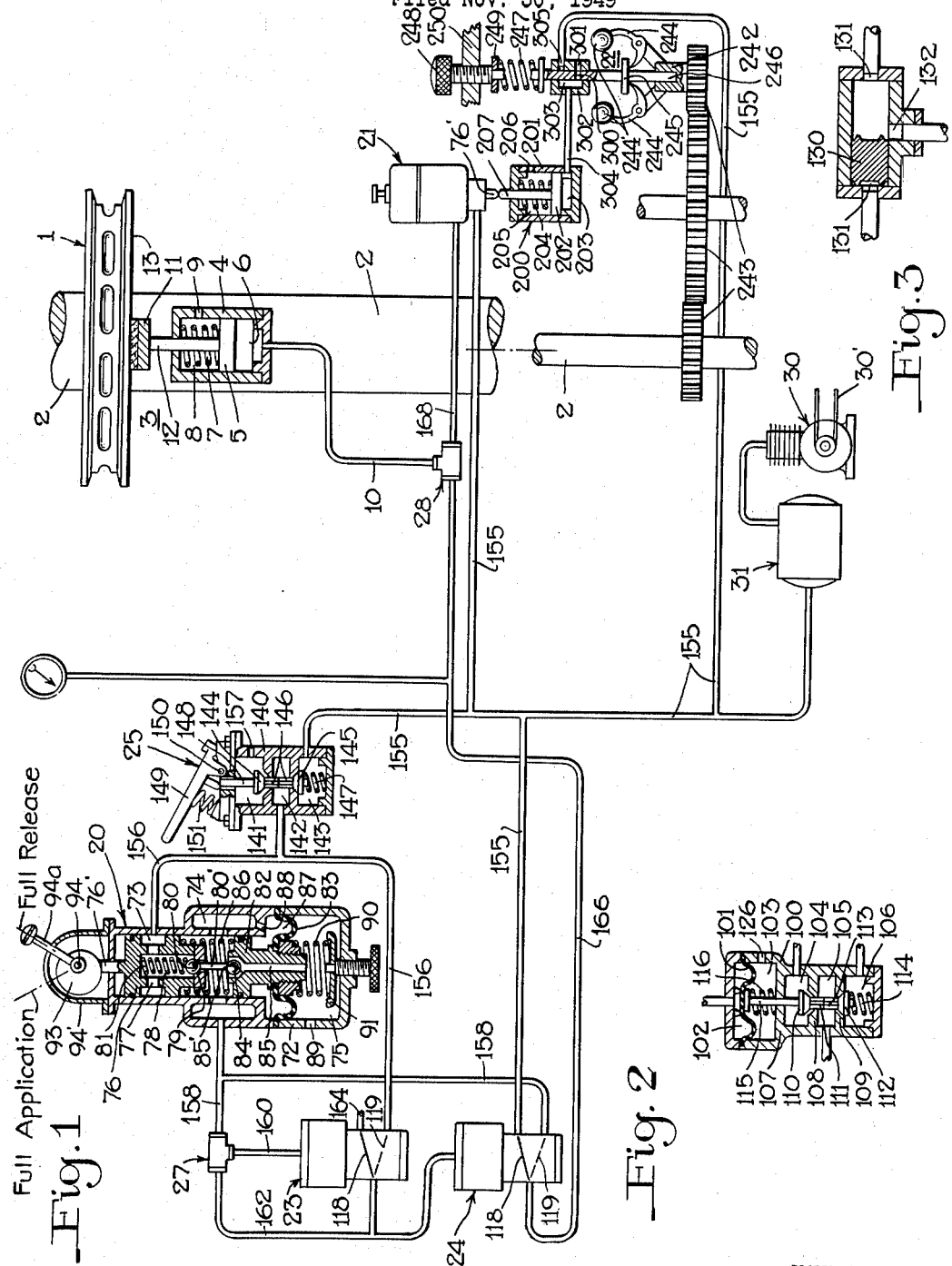

2,714,943

FLUID PRESSURE BRAKE APPARATUS

Fred S. Whaley, Greensburg, Pa., assignor to Westinghouse Air Brake Company, a corporation of Pennsylvania Application November 30, 1949, Serial No. 130,098

6 Claims. (Cl. 188—151)

This invention relates to fluid pressure brake apparatus and more particularly to fluid pressure brake apparatus adapted for use in braking a rotary element such as the "wildcat" of an anchor chain windlass.

The principal object of the invention is the provision of fluid pressure brake apparatus for a rotary element, such as the "wildcat" of an anchor chain windlass, which is urged to rotate when unbraked.

Other objects and advantages of the invention will become apparent from the following more detailed description.

In the accompanying drawing; Fig. 1 is a schematic representation, partly in outline and partly in section, of fluid pressure brake apparatus embodying the invention; Fig. 2 is a cross-sectional schematic view showing details of a relay valve device, several of which are employed in the apparatus shown in Fig. 1; and Fig. 3 is a cross-sectional view of a shuttle valve device, several of which also are employed in the same apparatus.

Description

In the drawing, reference numeral 1 designates a rotary element such as a "wildcat" of an anchor chain windlass on which an anchor chain (not shown) for a ship may be fed into and out of the water in raising and lower the ship's anchor (not shown). The rotary element 1 is secured to a shaft 2 which may be driven by the usual windlass drive (not shown) for raising the anchor and chain out of the water.

According to the invention, a fluid pressure brake 3 is provided for applying a restraining force to oppose rotation of the rotary element 1. The brake 3 may be of the disc type advantageously, but for sake of schematic illustration, the brake may simply comprise a casing 4 having a brake cylinder piston 5 slidably disposed therein which is subject opposingly to pressure of fluid in a brake cylinder pressure chamber 6 at its one side and to force of a piston return spring 7 disposed in a spring chamber 8 at its opposite side. The pressure chamber 6 is connected to a brake cylinder pipe 10, while the spring chamber 8 is constantly open to atmosphere by way of such as a port 9 in the casing. The brake cylinder piston 5 is operatively connected to a brake shoe 11 through a piston rod 12. The shoe 11 may be disposed opposite to one face 13 of the rotary element 1 for frictional engagement therewith. By supply of fluid under pressure to the brake cylinder chamber 6, piston 5 will be caused to move against opposing action of the return spring 7 to a position in which it is shown in the drawing to cause the engagement of the shoe 11 with the rotary element 1. The force exerted by the shoe 11 against the face 13 is determined by the degree of pressure of the fluid supplied to the chamber 6. By reduction in pressure of fluid in the chamber 6, the force exerted by shoe 11 against the face 13 may be reduced accordingly. Substantially complete release of fluid under pressure from the chamber 6 will allow the spring 7 to return the brake cylinder piston 5 to a position opposite to that in which it is shown in the drawing, with the brake shoe 11 disposed away from the wildcat 1, thus releasing the brake 3.

For controlling the degree of brake application as desired, hence the rate of anchor chain feed, for example, a self-lapping valve device 20 is provided for controlling the degree of brake application according to speed of rotation of the shaft 2; a self-lapping valve device 21 similar to valve device 20 and operably connected to a speed governor device 22, is provided, which, according to a feature of the invention, prevents "run-away" of the anchor chain; relay valve devices 23 and 24 are provided, arranged in cooperation with a foot operated valve device 25 to control an automatic application of the brake 3 according to another feature of the invention, as will be set forth hereinafter; shuttle valve devices 27 and 28 are provided at required junctions, as will be described; and such as an air compressor 30 adapted to be driven by a motor (not shown) through such as a belt 30' is provided to furnish the working fluid for the fluid pressure control apparatus. A reservoir 31 provides a volume for storing such working fluid supplied by the compressor.

Referring to Fig. 1, the self-lapping control valve devices 20 and 21 may comprise a casing 72 having a fluid pressure supply chamber 73, a delivery chamber 74, and an exhaust chamber 75 therein. A supply valve seat element 76, attached to an operating stem 76' is adapted for reciprocable movement within the casing 72. Element 76 is open intermediate its ends to the supply chamber 73 by way of ports 77 and a central cavity 78, and at its lower end, as viewed in the drawing, to the delivery chamber 74 by way of a supply valve seat 79. A supply valve 80 in the form of a ball may be disposed within cavity 78 for controlling communication between the supply chamber 73 and the delivery chamber 74. A bias spring 81 is disposed in the cavity 78 arranged to urge the valve 80 toward a normally closed position on seat 79. An exhaust valve seat element 82, secured for reciprocable movement with deflection of a diaphragm, 83, is open at one end to the delivery chamber 74 and has an exhaust valve seat 84 formed therein. Valve seat element 82 extends through the diaphragm 83 with its opposite end disposed in the exhaust chamber 75 and has a central opening 85 extending from end to end and through the valve seat 84 at the one end. An exhaust valve 85', connected to the supply valve 80 by a pin 80', also in the form of a ball, is disposed in delivery chamber 74 to cooperate with the seat 84 in element 82 for controlling communication via opening 85 between said delivery chamber and the exhaust chamber 75. A bias spring 86, disposed in the delivery chamber 74, is interposed between seat elements 76, 82 for biasing the seat element 76 in the direction of chamber 73. The diaphragm 83 is subject on one side to pressure of fluid in a diaphragm chamber 87, which pressure of fluid is that of the delivery chamber 74, the two chambers being connected one with the other by way of a choke 88. The opposite side of the diaphragm 83 is exposed to atmosphere by way of a port 89 in the casing. A compression control spring 90 is disposed in the exhaust chamber 75, interposed between the diaphragm and an adjustable spring seat element 91, for determining the degree of deflection of said diaphragm for any given pressure condition in the delivery chamber 74. The adjustable spring seat 91 is provided to allow for changing the precompression of the control spring 90.

For effecting adjustment of the stem 76' in valve device 20, a cam 93 is provided arranged for turning movement about a fixed shaft 94 by positioning of the operator's handle 94a which is secured to said cam. Cam 93 is disposed within a hollow cover cap 94' attached to the top of casing 72. Handle 94a projects outwardly through a slot in cap 94' and opposite ends of said slot may define extreme stop limits for travel of said handle within said slot.

The cam 93 is so shaped that as handle 94a is rocked from a "release" position, in which it is shown in the drawing, to or toward a "full application" position, stem 76' in device 20 will be displaced inwardly of casing 72 increasing distances in proportion to degree of movement of said handle.

In operation of the self-lapping valve devices 20, 21, when stem 76' is moved inwardly of the casing 72 a certain distance, the attached seat element 76 is moved downwardly, as viewed in the drawing, while the supply valve seat 79 formed in the end of element 76 is moved away from the supply valve 80. At this time, supply valve 80 will remain stationary due to seating engagement of the attached exhaust valve 85' on seat 84 of element 82. After the supply valve seat 79 moves away from the supply valve 80, supply chamber 73 is opened to delivery chamber 74 by way of ports 77, cavity 78 and seat 79. Fluid under pressure from supply pipe 156 or 155 connected to the respective supply chamber 73 will then flow into the delivery chamber 74 where the pressure of fluid will thus be caused to increase. Pressure of fluid in diaphragm chamber 87 open to chamber 74, being greater than the atmospheric pressure in chamber 75, will deflect diaphragm 83 against action of spring 90 in the direction of the last-mentioned chamber. Deflection of diaphragm 83 will carry the exhaust valve seat element 82 with it. Bias spring 81 will cause the supply valve 80 and exhaust valve 85' to follow movement of element 82, while said exhaust valve remains seated on seat 84 in the end of said element, until said supply valve seats on seat 79 in element 76. Upon seating of the supply valve 80, the supply chamber 73 is closed to the delivery chamber 74 and further increase in pressure in the latter chamber thereby will be prevented. In absence of further increase in delivery pressure in the diaphragm chamber 87, the pressure force on its one side will balance with the spring force on its opposite side and further deflection of said diaphragm will cease. The supply valve 80 and the exhaust valve 85' will remain seated. If, at this time, stem 76' were moved inwardly a greater amount, element 76 would again be moved downwardly to unseat from the supply valve 80, and the above described action would repeat, and an increase in pressure of fluid would be secured in the delivery chamber 74. The pressure of fluid thus obtained in the delivery chamber 74 will vary in substantial proportion to the degree of inward movement of the operating stem 76'. The minimum pressure which will be held in the delivery chamber 74 will depend on the degree of precompression of the control spring 90, which precompression may be changed by adjustment of the spring seat element 91.

If, subsequently, the operating stem 76' is allowed to be moved outwardly of casing 72 by action of spring 86 to a more extended position, the supply valve 80 and attached exhaust valve 85' will be carried with it. The exhaust valve 85 is thus unseated from seat 84 in element 82, and the delivery chamber 74 is thereby opened by way of opening 85 in said element to the exhaust chamber 75. Delivery pressure in chamber 74 is thus caused to reduce, and such reduction, reflected in the diaphragm chamber 87, allows the control spring 90 to deflect the diaphragm 83 upwardly. Upward deflection of the diaphragm 83 carries the element 82 into engagement with the exhaust valve 85'. The delivery chamber 74 is thus closed off from the exhaust chamber 75 and further reduction in delivery pressure thereby will be prevented. Under such condition, the diaphragm 83 ceases further deflection, and both the supply valve 80 and the exhaust valve 85' remain seated. A reduced delivery pressure, determined by position of the operating stem 76', is thus secured.

Summarizing action of the self-lapping valve devices 20, 21, it will be seen that with the proper adjustment of the spring 90, and with fluid at adequate pressure in chamber 73, the pressure of fluid in the delivery chamber 74 is determined by position of element 76 as adjusted through positioning of stem 76'. By effecting displacement of stem 76' inwardly of the casing 72, pressure of fluid in delivery chamber 74 will be increased in amount proportional to the degree of said displacement. Conversely, as outward movement of stem 76' is effected, the pressure of fluid in the delivery chamber 74 will be decreased in amount proportional to degree of said outward movement. In both valve devices 20, 21, a certain outermost limit position of the stem 76' is defined by rest position of cam 93 and foot pedal 25, respectively. The outermost limit position of stem 76' in devices 20, 21 corresponds to a certain minimum pressure in delivery chamber 74. Maximum inward displacement of stem 76' calls for maximum delivery pressure. Still further, both the valve device 20 and the valve device 21 is self-maintaining, that is, any tendency for increase or decrease in pressure of fluid in delivery chamber 74 out of accord with position of stem 76' is automatically compensated for to prevent such occurrence in manner as aforedescribed.

Referring to Fig. 2, the alike relay valve devices 23 and 24 shown in outline in Fig. 1 each may comprise a casing 100 having a diaphragm 101 disposed therein and subject to pressure of fluid in a diaphragm control chamber 102 at its one side and to pressure of fluid in a chamber 103 at its opposite side. Also formed in the casing are chambers 104, 105 and 106; chamber 104 being separated from the chamber 103 by a partition 107 and from the chamber 105 by a partition 108. A partition 109 separates the chamber 105 from the chamber 106. A valve 110 is disposed in the chamber 104 for controlling communication between the chamber 105 and said chamber 104. The valve 110 may be secured to a fluted stem 111 slidably mounted in a suitable bore extending through the partition 108, a valve seat being formed at the end of the bore opening into the chamber 104 to accommodate the valve 110. A valve 112, similar to the valve 110, is disposed in the chamber 106 for controlling communication between the chamber 105 and said chamber 106. The valve 112 is attached to a fluted stem 113 which is slidably disposed in a suitable bore extending through the partition 109, a valve seat being formed in the end of said bore opening into the chamber 106 to accommodate the valve 112. Both of the fluted stems 111 and 113 project into and meet in the chamber 105. A bias spring 114 is disposed in the chamber 106 arranged to urge the valve 112 towards its seat and at the same time, through engagement of stems 111 and 113, to urge the valve 110 away from its seat. The valve 110 is operably connected to the diaphragm 101 by means of a rod or stem 115 extending through a bore in the partition 107. A control spring 116 is provided in chamber 103 to oppose deflection of the diaphragm 101 in the direction of the chamber 103.

In operation of the relay valve device shown in Fig. 2, with the chamber 103 open to atmosphere, upon supply of fluid under pressure to the control chamber 102, the diaphragm 101 will deflect in the direction of the chamber 103 against opposition of the control spring 116 and the bias spring 114 and will cause seating of the valve 110 and unseating of the valve 112. With the valve 110 closed and the valve 112 open, the chamber 105 will be closed to the chamber 104 and open to the chamber 106. Upon subsequent venting of fluid under pressure from the control chamber 102, the bias spring 114 and the control spring 116 will return the diaphragm 101 and valves 110 and 112 to the positions in which they are shown in the drawing, the valve 112 being seated and the valve 110 unseated. With valve 110 unseated and the valve 112 seated, the chamber 105 will be closed to the chamber 106 and open to the chamber 104.

Hereinafter, in describing operation of either of the relay valve devices 23 and 24 included in the apparatus shown in Fig. 1, with the control chamber 102 vented to atmosphere when the valve 110 is unseated and the valve 112 is seated, connection between the chamber 105 and the chamber 104 by way of the unseated valve 110 will be referred to as a communication 118 represented symbolically in Fig. 1 by a solid line appearing within the outline of the valve devices. Similarly, when the valve 110 is seated and the valve 112 is unseated in response to supply of fluid under pressure to the respective control chamber 102 of either of the relay valve devices 23 or 24, the resultant connection between the chamber 105 and the chamber 106 by way of the unseated valve 112 will be referred to as a communication 119, indicated symbolically in the drawing by a dash line appearing within the general outline of the devices.

Referring to Fig. 3, the shuttle valve devices 27 and 28 each, schematically, may simply comprise a hollow cylindrical casing containing a piston valve 130 slidably disposed therein and subject opposingly to pressure of fluid from two opposite inlet openings 131. The piston 130 will assume a position upon a preponderance in pressure in one of the inlet openings 131 to establish communication between the inlet opening with the higher pressure and an outlet opening 132 while closing the inlet opening with the lower pressure off from said outlet opening.

The foot operated valve device 25, for sake of illustration, may comprise a casing 140 having exhaust, delivery, and supply chambers 141, 142 and 143, respectively, formed therein. A valve 144 is provided to control communication between the chamber 142 and the chamber 141 and a similar valve 145 is provided to control communication between the chamber 142 and the chamber 143. Each of the valves 144 and 145 is attached to a fluted stem 146 which is slidably disposed in a suitable bore in the casing and extends into the chamber 142 for abutting relationship one with the other at their projecting ends. A compression spring 147 is disposed in the chamber 143 and arranged to urge the valve 145 to a closed position in which it is shown in the drawing and to urge the valve 144 to an open position in which it also is shown in the drawing. A stem 148 is provided, attached to valve 144 and extending outwardly through an opening in the casing, to act as a medium through which the valves 144 and 145 may be actuated to a closed position and an open position, respectively, upon overcoming action of the spring 147. A foot pedal 149, attached to a base secured to the top of casing 140, is provided to act as a means which may be operated manually by foot to actuate the stem 148 and thereby valves 144 and 145. The foot pedal 149 is pivotally connected by means of a pin 150 to its base and is urged by a compression spring 151 to the position in which it is shown in the drawing with the valve 144 open and the valve 145 closed. By tramping the foot pedal 149, an operator may overcome action by springs 151 and 147 to close valve 144 and open valve 145. Opening and closing valve 144, opens and closes respectively the chamber 142 to the chamber 141. Opening and closing the valve 145, opens and closes respectively the chamber 142 to the chamber 143.

A control apparatus supply pipe 155 is provided which connects the reservoir 31 to the chamber 143 in the valve device 25, to the chamber 73 in valve device 21 and to the chamber 104 in valve device 24. A pipe 156 connects the chamber 142 in the valve device 25 to the chamber 73 in the valve device 20 and to the chamber 106 in the relay valve device 23. A pipe 158 connects the chamber 74 in valve device 20 to one inlet opening of the shuttle valve device 27 and to the chamber 106 in the relay valve device 24. A pipe 160 connects the outlet opening of the shuttle valve device 27 to the chamber 102 in the relay valve device 23. A pipe 162 connects the other inlet opening in the shuttle valve device 27 to the chamber 105 in the relay valve device 23 and to the chamber 102 in the relay valve device 24. A pipe 164 connects the chamber 104 in the relay valve device 23 to atmosphere. A pipe 166 connects the chamber 105 in relay valve device 24 to one inlet opening in the shuttle valve device 28, and a pipe 168 connects the other inlet opening in the shuttle valve device 28 to the chamber 74 in the valve device 21. The outlet opening in the shuttle valve device 28 is connected to the brake cylinder pipe 10.

For actuating the stem 76′ in valve device 21 a fluid pressure actuator 200 is provided. Schematically, the actuator 200 may comprise a hollow cylindrical casing 201 having a piston 202 slidably disposed therein which is subject opposingly to pressure of fluid in an actuator pressure chamber 203 at one side and to force of a compression spring 204 disposed in a spring chamber 205 at its opposite side, the latter chamber being constantly open to atmosphere by way of a port 206 in the casing. The piston 202 is operatively connected to the stem 76′ by means of such as an attached piston rod 207 which projects outwardly of the casing into abutting relationship with the projecting end of said stem 76′. When fluid under pressure is supplied to chamber 203, the piston 202 will move out of the position in which it is shown in the drawing in the direction of chamber 205 to cause inward displacement of the stem 76′ a distance according to the degree of pressure of such fluid. The actuator device 200 may be so mounted relative to the valve device 21 that when the piston 202 is in a rest position in which it is shown in the drawing, the rod 207 will just touch the stem 76′ when fully extended. The piston 202 will assume its rest position in which it is shown in the drawing when pressure chamber 203 is substantially void of fluid under pressure and with the stem 76′ in its fully extended position, the pressure of fluid in the pipe 168 will be substantially atmospheric. As the piston moves in the direction of chamber 205 in response to a proportionate increase in pressure of fluid in the chamber 203, the pressure of fluid in the pipe 168 will be increased a like proportion in response to inward movement of the stem 76′, as will be appreciated from preceding description. The spring 204 will move the piston 202 to positions in the direction of chamber 203 to allow the stem 76′ to move to corresponding positions outwardly of the casing of device 21 as the pressure of fluid in the device 200 is reduced.

The speed governor device 22 may comprise a rotatable governor head 242 adapted to be revolved by the shaft 2 through gears 243. The head 242 pivotally carries two oppositely arranged bell cranks 244 having governor weights 244′ at their outer ends, while their adjacent inner ends engage a collar 245 which is secured to a longitudinally movable adjusting rod 246. A governor control spring 247 acts against the rod 246 in opposition to centrifugal action of the bell cranks 244, upon rotation of the head 242 by the shaft 2. An adjusting screw 248, with an attached spring seat washer 249, in screw-threaded attachment with a fixed element 250 provides for varying the compression of the spring 247 to change the speed setting of the governor device as desired.

Schematically, the adjusting rod 246 may be provided with a transverse port 300 which is located for registry with an atmospheric port 301 formed in an encircling fixed sleeve member 302 when the rod 246 is in the position in which it is shown in the drawing. A chamber 303 in the sleeve member 302 is constantly open to one end of the port 300 and with the pressure chamber 203 in the actuator device 200 by way of a pipe 304. A supply port 305 is also provided in sleeve member 302 disposed a certain distance away from the port 301 for registry with the port 300 in stem 246. The port 305 is connected to a branch of the system supply pipe 155.

In operation, rotation of the governor head 242 along with the shaft 2 and rotary element 1 will rotate the weights 244' which will tend to swing outwardly of the rod 246 against opposition of the spring 247 acting through the rod 246, attached collar 245 and bell cranks 244. When the speed of rotation of the shaft 2 and therefore head 242 increases above a certain speed, determined by compression of the spring 247, the resultant centrifugal force generated by rotation of the weights 244' will cause upward movement of the rod 246, causing the port 300 to leave registry with the atmospheric port 301 and assume a position intermediate port 305 and 301 in what may be called its lap position in which the chamber 303 is prevented from communication with either the supply pipe 155 or the atmosphere by way of port 300 to hold any existent pressure of fluid in the pressure chamber 203 in the actuator device 200. Equilibrium between the force of the spring 247 and the centrifugal force generated by the rotating weights 244' is thus maintained with rod 246 in lap position so long as the speed of rotation of the shaft 2 remains constant. Should the shaft 2 tend to increase in speed, through the resultant increase in centrifugal force of the weights 244', the rod 246 will be displaced upwardly to cause the port 300 in said rod to register with the port 305, thereby allowing fluid under pressure from the supply pipe 155 to flow into the pressure chamber 203 in device 200 to call for movement of stem 76' to increase pressure of fluid in pipe 168 for increasing the degree of brake application by increase in pressure in the brake cylinder pressure chamber 6. The port 300 in rod 246 will remain in registry with the port 305, allowing the perssure in chamber 203, hence pipe 168, hence the brake cylinder pressure chamber 6 to increase so long as the shaft 2 does not again reduce to its former speed. When the shaft 2 does return to its former speed in response to the increased degree of braking of elements 1, the resultant decrease in centrifugal force of the weights 244' will allow the spring 247 to move the rod 246 back to its lap position to hold the pressure in chamber 203 for maintaining position of stem 76' to hold the increased pressure in brake cylinder pressure chamber 6. When the speed of rotation of the element 1, hence shaft 2 and governor head 242 slows down below the above-mentioned certain speed, the resultant decrease in centrifugal force of the rotating weights 244' will allow the spring 247 to move the rod 246 out of its lap position to expose the port 300 to atmospheric port 301, thereby allowing for reduction in pressure of fluid in chamber 203 through release of fluid by way of pipe 304, chamber 302, and ports 300 and 301 to allow for a decrease in pressure in pipe 168 through outward movement of stem 76' as piston 202 moves in the direction of chamber 203. The rod 246 will remain so positioned with its port 300 in registry with atmospheric port 301 so long as the speed of element 1, hence shaft 2, remains below the aforementioned certain speed, as determined by the compression of the spring 247, which may be changed as desired by adjustment of screw 248.

In practice, the actuator 200, governor device 22, sleeve member 302 etc. would probably be in the form of one of the commercial hydraulic governor devices which provide an input shaft to be connected to a rotary element and an output shaft for connection with means to be actuated in some fashion according to speed of rotation of the rotary element.

*Operation*

Assume that the reservoir 31 is charged with fluid under pressure as therefore will be the supply pipe 155. Assume that the operator's station is unmanned, with the foot pedal 149 of valve device 25 in its inactive position in which it is shown in the drawing. The pipe 156 therefore will be vented to the atmosphere by way of the unseated valve 144 in device 25. Assume that operator's handle 94a of the control valve device 20 is in its "full release" position in which it is shown in the drawing. The pipe 158 therefore will be vented to atmosphere by way of the unseated release valve 85 in device 20, as will be appreciated from previous description. The pipe 162 will be vented at this time regardless of position of the relay valve device 23 either by way of the pipe 164 or by way of the now vented pipe 156. With both of the pipes 162 and 158 vented, the control chamber 102 (refer also to Fig. 2) in the relay valve device 23 will be vented by way of the pipe 160 and the shuttle valve device 27 so that the communication 118 in the relay valve device 23 is established connecting pipe 162 to the exhaust pipe 164, as will be appreciated from the previous description of operation of the relay valve device. With the pipe 162 vented, the control chamber 102 in the relay valve device 24 is so vented, with the communication 118 in said device in establishment. The pipe 166, therefore, will be connected to the charged control supply pipe 155 via communication 118 in relay valve device 24, so that the brake cylinder perssure chamber 6 in the brake 3 also will be charged with fluid under pressure by way of the brake cylinder pipe 10, the shuttle valve device 28 and the pipe 166. The brake 3 therefore will be fully applied with its shoe 11 in engagement with the face 13 of the wildcat 1 which we will assume is not rotating. The applied brake 3 will prevent the rotary element 1 from turning as it will be urged to do by weight of an anchor chain or cable in hoisting apparatus, for example, were the rotary element 1 a cable drum with weight supporting cable wound on it in the latter instance. With the rotary element 1 stopped, the shaft 2 and the governor weights 244' of governor device 22 will consequently be stationary so that actuator pressure chamber 203 will be vented via pipe 304, chamber 303 and ports 300, 301 and the piston 202 in actuator 200 will be so positioned that stem 76' of the valve revice 21 will be in its fully extended position with the pipe 168 vented as a result, as will be appreciated from previous description of operation of the governor device 22 and of the valve device 20.

Now assume that the operator's station is manned, to effect a controlled release of the brake 3 on rotary element 1 to lower anchor and chain, for chosen example, or, to lower hoisting cable such as on a rotary drilling rig, fo another example. The operator will tramp and hold the foot pedal 149 of the valve device 25 depressed. The valve 144 and the valve 145 in device 25 will be caused to close and open, respectively, and remain so as long as the operator remains standing on the foot pedal 149. The pipe 156 then will become connected to the control supply pipe 155 by way of the unseated valve 145 in valve device 25, whereupon fluid under pressure will flow to the supply chamber 73 in the valve device 20. At this time the status of all other parts of the apparatus will remain as aforedescribed, with the brake 3 remaining fully applied while the fluid in the brake cylinder pressure chamber 6 is at the pressure existing in the reservoir 31.

In order to release the brake 3 in any degree, the operator, while maintaining the foot pedal 149 depressed, must move the handle 94a of the operator's control valve device 20 out of its "full release" position toward and substantially, if not to, its "full application" position, thereby effecting supply of fluid from the pipe 156 to the pipe 158 at a pressure which will substantially equal the full reservoir pressure in the pipes 156 and 155. The fluid under pressure thus supplied to the pipe 158 will flow by way of the shuttle valve device 27 and the pipe 160 to the control chamber 102 in the relay valve device 23 which will then respond to disestablish its communication 118 and to establish its communication 119 to connect the pipe 162 to the now charged pipe 156. Fluid at reservoir pressure from the pipe 156 will then flow through the relay valve device 23 into the pipe 162 to the shuttle valve device 27 and to the control chamber 102 in the relay valve device 24 which will respond to disestablish its communication 118, which connects the pipe 166 to the control supply pipe 155, and to establish its communication 119 to connect the pipe 166 to the pipe 158 which is charged at this time with fluid at substantially the same pressure as that in the control supply pipe 155 connected directly to the reservoir 31. The pipe 166 will remain charged with fluid at reservoir pressure at this time, as will the brake cylinder pressure chamber 6, by way of the pipe 10 and the shuttle valve device 28. The brake 3 yet remains fully applied, the shaft 2 remains stationary, as therefore do the governor weights 244' of the governor device 22, so that the valve device 21 will yet maintain the pipe 168 vented to atmosphere.

With the communication 119 in the relay valve device 24 established, and the pipe 166 thereby connected to the pipe 158, it will be seen that fluid under pressure in the brake cylinder pressure chamber 6 may be released via pipe 10, shuttle valve device 28, said pipe 166, said communication 119, and said pipe 158 by movement of the operator's handle 94a in the direction of "full release" according to the degree of such release desired. Conversely, the pressure of fluid in the brake cylinder pressure chamber 6, via the same path, may be re-increased as desired by movement of the operator's handle 94a again toward "full application" position, as will be appreciated from the previous description of operation of the valve device 20. The relay valve devices 23 and 24 will remain in their respective positions last assumed, each with their respective communications 119 established by virtue of the pressure of fluid at reservoir pressure from the pipe 156 held in their respective control chambers by way of the pipe 162 alone, in case of device 24, and the shuttle valve device 27 and pipe 160 in addition, in the case of device 23. It will be seen that so long as the foot pedal 149 remains depressed, with pipe 156 consequently connected to the pipe 155, once the relay valve devices operate to establish their respective communications 119, such communications will be maintained, thereby allowing for control of operation of the brake 3 by operation of the operator's control valve device 20 through manipulation of its control handle 94a, as aforedescribed.

At a certain reduction in pressure of fluid in the brake cylinder pressure chamber 6, effected as above described, with a load (not shown) tending to turn the rotary element 1, such as anchor chain or hoist cable, the force of the brake shoe 11 against the face 13 will be lessened to the extent that the rotary element will be turned by the load. The rate at which it will turn will depend upon the degree of reduction in pressure of the fluid in the brake cylinder pressure chamber 6. In the case of anchor chain being played out in lowering the anchor on a ship, the greater amount of chain played out and thereby suspended from one edge of the rotary element 1 the greater the force tending to turn said element, so that for a given initial degree of brake application, as the anchor is lowered there is a tendency for the chain to increase in travel speed and to "run away." To prevent such "run away" from occurring, as the speed of rotation of the element 1 increases, the shaft 2 in rotating with the element 1 will rotate the governor weights 244' at an increasing speed, which will thereby cause upward movement of the stem 246 for causing registry between ports 300 and 305 to effect pressurization of the pipe 168 until the speed of rotation of the element 1 and shaft 2 is brought into accord with the speed setting of the governor device, as will be appreciated from previous description in connection therewith. When the pressure of fluid in the pipe 168 becomes greater than the pressure of fluid in the pipe 166, the shuttle valve device 28 will disestablish connection between the pipe 10 and the pipe 166 and establish connection between the pipe 10 and the pipe 168. It will be seen then, that control of the degree of brake application automatically transfers from the operator's control valve device 20 to the speed controlled valve device 21 upon attainment of a pressure in the pipe 168 greater than the pressure in the pipe 166 hence at a certain speed of rotation of rotary element 1.

As the speed of rotation of the rotary element 1 and shaft 2 increase a certain degree above a chosen value, the resultant increase in pressure effected in the brake cylinder pressure chamber 6 via the shuttle valve device 28 will be sufficient to maintain the rotary element turning at a substantially constant speed as the anchor chain is fed out, thereby preventing "run away" and precluding necessity for numerous adjustments in position of the operator's handle 94a were the operator's control valve device 20 alone employed to control the brake 3. The speed of rotation of element 1 which the valve device 21 and governor device 22 will maintain, will depend upon the compression of spring 247, which may be varied as desired by adjustment of the screw 248.

When it is desired to slow down or stop the rotary element 1 while thus turning, such as at a time when the anchor nears bottom, the operator's handle 94a may be moved toward or to its "full application" position to increase, up to a maximum if necessary, the pressure of fluid in the pipe 166. When pressure of fluid in the pipe 166 again exceeds the pressure of fluid in the pipe 168, the shuttle valve device 28 again will establish connection between the pipe 10 and the pipe 166 to allow the fluid at the preponderance in pressure to reach the brake cylinder pressure chamber 6 to cause an increase in the degree of application of the rotary element 1 to slow down and/or to stop said element, anchor and chain.

If, then, the operator desires to leave his station for duties elsewhere, he may allow the handle 94a to remain in such as its "full application" position, or any other position, remove his foot from pedal 149 and walk away.

When the operator's foot leaves the pedal 149, the valve device 25 will respond to disconnect the pipe 156 from the control supply pipe 155 and to connect said pipe 156 to the atmosphere via port 157, as will be appreciated from previous description. Fluid under pressure will then flow from the control chamber 102 in the relay valve device 24 by way of the pipe 162, the communication 119 in the relay valve device 23 and the pipe 156 to atmosphere via valve device 25. It should be pointed out that when the pipe 158 also is vented to atmosphere, at the same time that the pipe 162 is vented via pipe 156 as above described, fluid under pressure will release by way of pipe 160 and shuttle valve device 27 from the control chamber 102 in the relay valve device 23 which will then respond to disestablish its communication 119 and to establish its communication 118, thereby disconnecting the pipe 162 from the vented pipe 156 and connecting said pipe 162 directly to atmosphere via the pipe 164. It will be seen that in either event, the control chamber 102 in the relay valve device 24 will be vented along with the pipe 156 when the operator's foot leaves the pedal of the valve device 25. In response to venting of its control chamber 102, the relay valve device 24 will disestablish its communication 119 and establish its communication 118, thereby disconnecting the pipe 166 from the pipe 158 and connecting said pipe 166 to the system supply pipe 155. If, at the time of such change in connection of the pipe 166 from the pipe 158 to the pipe 155, the pipe 158 is charged with fluid at a pressure determined by position of the operator's handle 94a, fluid under pressure from the pipe 155 will flow into the pipe 166 to the brake cylinder chamber 6 until the pressure in pipe 166 equals the reservoir pressure in said pipe 155. It will be appreciated that if at the time of such change in connection the pipe 158 is charged with fluid at full reservoir pressure, with operator's handle 94a in its "full application" position, when the pipe 166 becomes connected to the pipe 155 there will be no flow of fluid under pressure into said pipe 166, but the brake 3 will be maintained fully applied. With the pipe 166 thus connected to the pipe 155 the brake 3 will remain fully applied even though the pipe 158 should be vented with movement of the operator's handle 94a to its "full release" position. This feature of the invention assures an adequate brake application when the control station is unmanned and prevents unintentional release of the brakes without conscious effort on the part of an operator.

When it is desired to again release the brake 3 fully or in part, the operator may again take control of such release by depressing the foot pedal 149 of valve device 25 and while holding said pedal depressed during control of brake release, move the operator's handle 94a of device 29 to or substantially to its "full application" position to operate the relay valve devices 23 and 24 to again connect the pipe 166 to the pipe 158 as previously described. It will be appreciated that, if at the time that fluid under pressure is supplied to the pipe 156 by depression of the foot pedal 149, the operator's handle is already in its "full application" position, fluid at reservoir pressure in the pipe 156 will flow by way of the unseated valve 80 in valve device 29 into the pipe 158 to operate the relay valve device 23 and consequently the relay valve device 24 as aforedescribed without necessitating movement of the operator's handle 94a until the release of brake 3 is desired.

Summary

It will now be seen that I have provided fluid pressure brake apparatus for braking a rotary element such as an anchor chain windlass on a ship or a draw works cable drum on a rotary drilling rig, for example. The brake apparatus comprises manually operable control means for regulating the degree of braking of the rotary element according to dictates of an operator, means responsive to speed of rotation of the rotary element to automatically adjust the degree of braking of the rotary element so as to prevent its obtaining a speed above that determined by a preselected speed setting and other means operable to effect full braking of the rotary element automatically upon an operator leaving the control station and to require a conscious effort on the part of an operator manning the station before such full braking of the rotary element may be terminated.

Having now described my invention, what I claim as new and desire to secure by Letters Patent, is:

1. The combination with a source of fluid at a certain pressure, of a brake cylinder device having a brake cylinder pressure chamber and operable to apply a braking force to a device to be braked according to the degree of pressure of fluid in said pressure chamber, an operator's control valve device having a first supply chamber, a first delivery chamber and a first exhaust chamber and comprising valve means operable manually to regulate the degree of pressure of fluid in said first delivery chamber between said certain pressure and a minimum pressure through control of communication between said delivery chamber and either said first supply chamber or said first exhaust chamber, a second operator's valve device having a second supply chamber connected to said source, a second delivery chamber and a second exhaust chamber and comprising valve means biased to one position establishing a first fluid pressure connection between said second delivery chamber and said second exhaust chamber and operable manually to another position to disestablish said first fluid pressure connection and to establish a second fluid pressure connection between said second delivery chamber and said second supply chamber, a first conduit connecting said first supply chamber to said second delivery chamber, first and second relay valve devices each having a first, second, third and control chamber and each comprising valve means responsive to establishment of said certain pressure in its respective control chamber to establish a first fluid pressure communication between its respective second and third chambers and responsive to reduction in pressure in its respective control chamber below said certain pressure to disestablish said first communication and to establish a second fluid pressure communication between its respective first and second chambers, a shuttle valve device having one inlet connected to said first delivery chamber and to the third chamber in the second relay valve device, having another inlet connected to the second chamber in the first relay valve device and to the control chamber in the second relay valve device, and having an outlet connected to the control chamber in the first relay valve device, an exhaust conduit connecting the first chamber in the first relay valve device to atmosphere, a second fluid pressure conduit connecting the third chamber in the first relay valve device to said first conduit, and third and fourth conduits connecting the first and second chambers in the second relay valve device to said source and to said brake cylinder pressure chamber, respectively.

2. In a hoisting mechanism, the combination with a rotary element adapted to feed out a flexible line for lowering a suspended weight, braking means for restraining rotation of said rotary element, manually controlled means responsive to movement of an operator's control element to control degree of application of said braking means, speed controlled means responsive to rotational speed of said rotary element above a certain value to control degree of application of said braking means for preventing increase in said rotational speed to any material extent above said certain value, and means cooperative with said manually controlled means and with said speed controlled means to render said braking means responsive to either the manually controlled means or to the speed controlled means according to whichever means calls for the greater degree of brake application.

3. In combination with a rotary hoisting element adapted to feed out a flexible line for lowering a suspended weight, brake means operable by fluid to impose on said rotary hoisting element, when acting in a lowering capacity, a rotation restraining force proportional to the pressure of such fluid, a source of fluid under pressure, a first conduit for fluid pressure communication with said brake means, a second conduit for fluid pressure communication with said brake means, shuttle valve means having opposite inlets connected to the first and second conduits, respectively, and an outlet connected to said brake means to selectively communicate said brake means with whichever of the two conduits is pressurized to the greater extent, first brake control means operable to selectively establish communication between said first conduit and either said source or the atmosphere for regulating and automatically maintaining pressure of fluid in said first conduit in accord with manually selective positions of an operator's control element, second brake control means including valve means operable to selectively establish communication between said second conduit and either said source or the atmosphere, and adjustable speed responsive means operably connected to said rotary element and operatively connected to said valve means to establish connection of said second conduit to said source when said rotary element is rotating above a certain maximum allowable speed and to connect said second conduit to atmosphere when rotational speed of said rotary element is below said certain maximum allowable speed.

4. In a hoisting mechanism, the combination with a rotary element adapted to feed out a flexible line for lowering a weight suspended on said line, braking means for restraining rotation of said rotary element during its weight lowering operation, first manually controlled means capable of controlling the degree of application of said braking means responsively to selective positioning of an operator's control element, second manually controlled means biased to render said first manually controlled means ineffective to control said braking means and to effect an emergency application of said braking means to stop rotation of said rotary element and operable manually to establish an interlock condition in behalf of rendering said first manually controlled means again effective to control said braking means, and interlock means controlled by the first and second manually controlled means to render said first manually controlled means effective only while said interlock condition persists after coexistent manipulation of said operator's control element to a position calling for a degree of brake application capable of maintaining said rotary element stopped.

5. In a reeling mechanism adapted to raise and lower a flexible line supported weight, a rotary element adapted to feed out a flexible line for lowering a suspended weight according to weight induced rotational speed of said element, fluid pressure brake means responsive to fluid pressure to restrain rotation of said rotary element according to degree of such pressure, a source of fluid under pressure, an operator's control valve device operable to create variations in pressure of fluid from said source according to the degree of brake application desired by an operator, dead man control means operable upon relaxation of a manual effort on a control member to automatically regulate pressurization of said brake means for realization of a maximum degree of brake application and to render said operator's control valve device incapable of controlling pressurization of said brake means, and means controlled by said dead man control means and by said operator's control valve device to render the latter effective to control pressurization of said brake means only upon reapplication of said manual effort and after establishment by said operator's control valve device of a fluid pressure corresponding to a maximum degree of brake application.

6. The combination as set forth in claim 3, including means responsive to rotational speed of said rotary element to create variations in pressure of fluid from said source corresponding to degrees of brake application capable of maintaining rotational speed of said rotary element below a safe limit above which a maximum degree of brake application might be incapable of stopping said rotary element or incapable of doing so within a safe period of time, and means automatically establishing fluid pressure communication between said brake means and the aforegoing pressure regulating instrumentalities according to which one calls for the greatest degree of brake application.

References Cited in the file of this patent

UNITED STATES PATENTS

| | | |
|---|---|---|
| 614,346 | Reynolds | Nov. 15, 1898 |
| 1,726,599 | Wasson | Sept. 3, 1929 |
| 1,977,895 | Robinson | Oct. 23, 1934 |
| 2,416,222 | Rodway | Feb. 18, 1947 |
| 2,544,997 | Keim et al. | Mar. 13, 1951 |
| 2,578,388 | Ambler | Dec. 11, 1951 |

FOREIGN PATENTS

| | | |
|---|---|---|
| 605/36 | Australia | Feb. 18, 1936 |
| 630,646 | Germany | June 3, 1936 |